A. KLEINATLAND.
VEHICLE TIRE.
APPLICATION FILED APR. 8, 1911.
1,029,569.
Patented June 11, 1912.
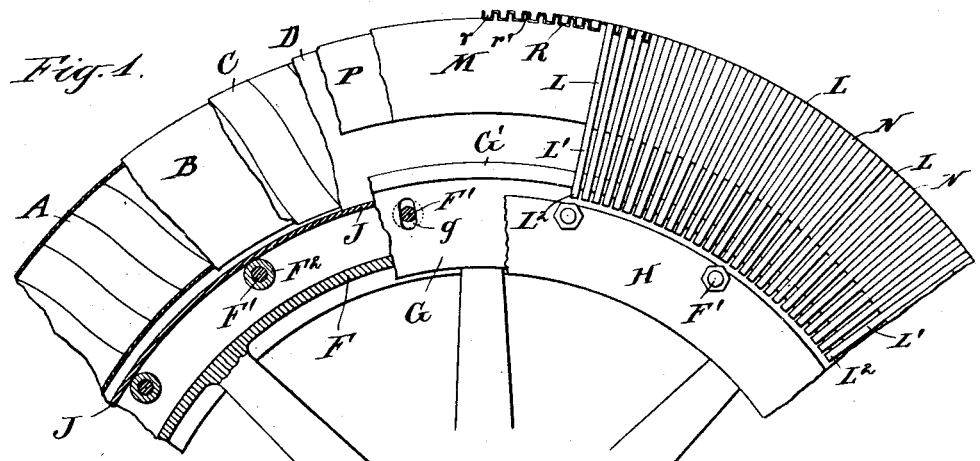
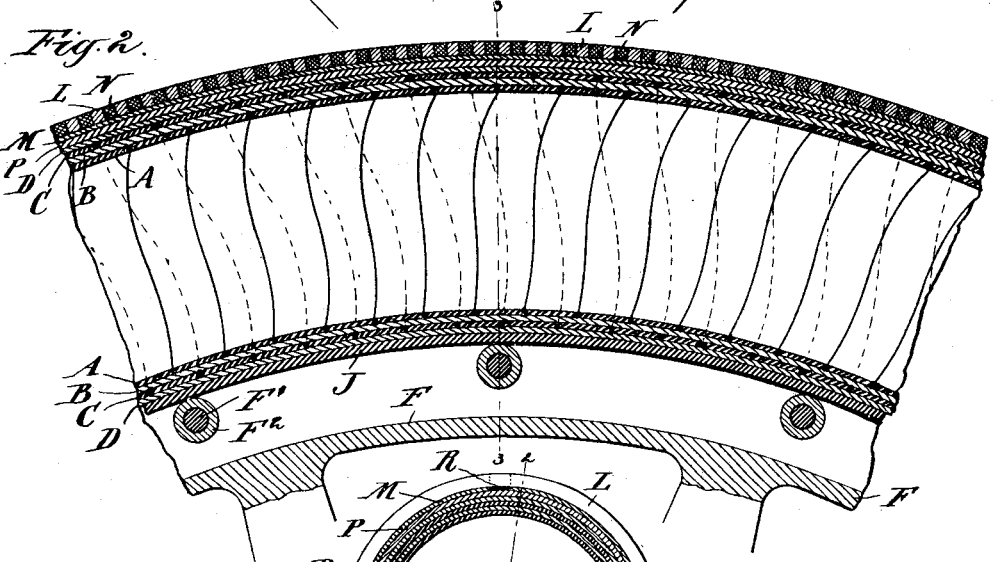
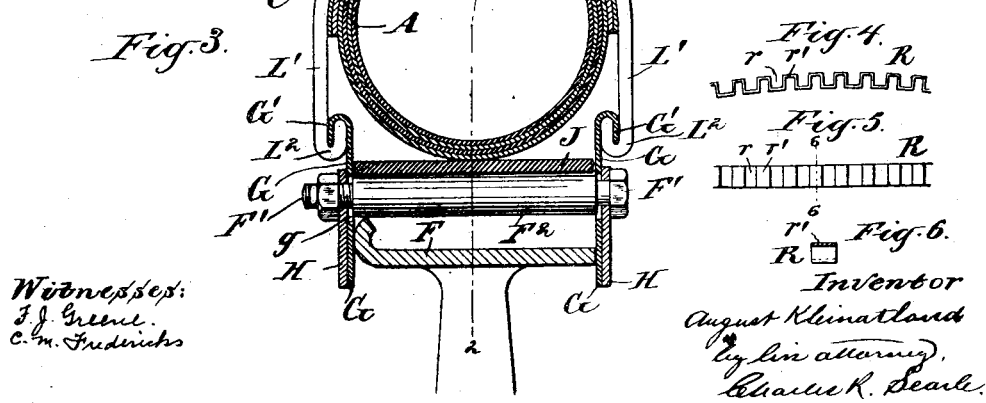

UNITED STATES PATENT OFFICE.

AUGUST KLEINATLAND, OF PATERSON, NEW JERSEY, ASSIGNOR TO ATLANTIC PUNC-TURELESS TIRE CO., OF PATERSON, NEW JERSEY, A CORPORATION OF NEW JERSEY.

VEHICLE-TIRE.

1,029,569.  Specification of Letters Patent.   Patented June 11, 1912.

Application filed April 8, 1911. Serial No. 619,696.

*To all whom it may concern:*

Be it known that I, AUGUST KLEINATLAND, a subject of the Emperor of Germany, residing at Paterson, in the county of Passaic and State of New Jersey, have invented a certain new and useful Improvement in Vehicle-Tires, of which the following is a specification.

The invention relates particularly to tires for motor vehicles and the like, and is intended to supply a substitute for the pneumatic tires generally used.

The object of the invention is to provide an economically constructed tire having the requisite resiliency and yielding qualities, which will resist wear successfully and lessen the danger of skidding or sliding laterally when in service.

The invention consists in certain novel features and details of construction and arrangement of parts by which the above objects are attained, to be hereinafter described and pointed out in the claims.

The accompanying drawings form a part of this specification and show an approved form of the invention.

Figure 1 is a side view of a portion of a wheel equipped with the invention, certain portions being shown as removed in successive layers to show the construction, and partly in vertical section. Fig. 2 is a corresponding vertical section on a larger scale, the plane of section being indicated by the line 2—2 in Fig. 3. Fig. 3 is a transverse section through the wheel-rim and tire, taken on the line 3—3 in the preceding figure. Fig. 4 is an elevation showing a portion of an annular spacing strip or ribbon used in locating portions of the tire. Fig. 5 is a corresponding plan view. Fig. 6 is a cross section of the same on the line 6—6 in Fig. 5.

Similar letters of reference indicate the same parts in all the figures.

The body of the tire is composed of continuous spirally arranged flat strips of metal formed into annular helices one within another, separated by layers of rubber vulcanized with the helices in place therein; the rubber serving as a binder to hold the helices in the desired relative positions while permitting them to change their forms as required in revolving under a load. For the inner helix A a continuous strip of thin steel is preferred inclosed in an envelop of rubber B which in turn is surrounded by a second helix C of metal, preferably spring brass, and the whole inclosed in a covering of rubber D. The helices and rubber thus assembled are supported and held in suitable molds and vulcanized to produce a single complete tubular annulus. The tire thus constructed has the necessary resiliency by reason of the elasticity and shape of the metal employed, each helix reinforcing the other and the rubber serving to transfer a portion of the strains resisted to adjacent parts of the tire. For heavy service the number of metal helices similarly arranged and joined may be increased.

In mounting the tire upon the wheel various devices or methods may be employed. In the arrangement shown F is the rim of a wheel on the faces of which are segmental plates G having radial slots $g$ therein and an outwardly and downwardly curved flange $G^1$ on the periphery. Similar but narrower segmental plates or strips H are applied on the outer faces of the plates G and the latter with the strips H are firmly compressed upon the sides or faces of the rim F by bolts $F^1$ extending transversely through the slots $g$. Each bolt passes through a distance-tube or hollow strut $F^2$ serving to hold the plates G properly separated, and encircling the series of struts $F^2$ is an annular bearing-plate J with which the inner face of the tire is in contact and which receives the strains of compression when the tire is loaded.

Upon the tread of the tire is applied an annular shoe composed of a series of slightly separated semicircular loops L having their ends extended to form legs $L^1$ the extremities of which are bent inwardly as hooks $L^2$ adapted to engage the flanges $G^1$ on the segmental plates G and be thus held in place. The inner concave faces of the loops are covered with a continuous strip or layer of canvas M, and the interstices between adjacent loops are filled with rubber N and vulcanized, thus attaching each loop to the next and joining all to the canvas M.

In assembling the wheel the nuts of the bolts $F^1$ are removed and the plates G and strips H taken away from one side, the tire is then placed within the shoe and the hooks $L^2$ on one face engaged with the hooked flanges of the remaining plates G. The removed plates G are then engaged with the hooks on the opposite side of the shoe and applied against the rim F with the bolts F¹ projecting through the slots $g$, the segmental strips H are next applied and the nuts again engaged and turned down. The slots $g$ permit the plates G to be drawn toward the center of the wheel in tightening the shoe upon the tread of the tire.

The loops L are preferably of steel wire, square in cross-section, and as an aid in properly spacing them, a ribbon R of thin metal corrugated as shown, is applied upon the canvas M before applying the rubber N, each depression $r$ of the ribbon receiving a loop, and each elevation $r^1$ separating such loop from the next, the thin ribbon thus located remains in the shoe held by the rubber N.

P is a layer of asbestos cloth or other non-conductor of heat interposed between the canvas M and outer rubber covering D on the tire proper; its function is to lessen the transference of heat from the shoe, due to road-surface friction, to the tire and prevent softening and injury to the latter from that source.

The tread of the shoe composed of alternating transverse strips of steel and rubber supplied by the loops L and rubber filling N, offers a surface peculiarly efficient in its grip on the road-surface and in its resistance to skidding, beside possessing exceedingly lasting wear-resisting qualities.

I claim:—

1. A tire, a rim, segmental plates on each side of said rim, each having a flange folded upon itself, a series of semicircular loops of metal covering the tread portion of said tire, each of said loops separated from the next, a layer of fabric on the inner faces of said loops, rubber in the spaces between said loops and vulcanized to the latter and to said fabric, hooks on the ends of said loops constructed to engage said flanges, and a non-conductor of heat arranged in the form of an annular layer between said fabric and tire.

2. A tire, a rim, segmental plates on each side of said rim, each having a flange folded upon itself, a series of semicircular loops of metal covering the tread portion of said tire, a ribbon of corrugated metal located on the peripheral line of said loops and separating each from the next, a layer of fabric on the inner faces of said loops, rubber in the spaces between said loops and vulcanized to the latter and to said fabric and ribbon, and hooks on the ends of said loops constructed to engage said flanges.

3. A tire, a rim, segmental plates on each side of said rim, each having a flange folded upon itself, bolts extending across said rim and connecting said plates, an annular plate supported by said bolts and carrying said tire, a series of semicircular loops of metal covering the tread portion of said tire, each of said loops separated from the next, a layer of fabric on the inner faces of said loops and vulcanized to the latter, hooks on the ends of said loops constructed to engage said flanges and non-conducting material interposed between said fabric and tire.

In testimony that I claim the invention above set forth I affix my signature, in presence of two witnesses.

AUGUST KLEINATLAND.

Witnesses:
CHARLES R. SEARLE,
FRANK W. S. ELSTROTH.